United States Patent
Gerstenberg et al.

(10) Patent No.: US 6,861,592 B2
(45) Date of Patent: Mar. 1, 2005

(54) METHOD FOR WEIGHING MAIL PIECES

(75) Inventors: Frank Gerstenberg, Berlin (DE); Peter Knispel, Arlington, TX (US)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 10/251,625

(22) Filed: Sep. 20, 2002

(65) Prior Publication Data

US 2004/0055790 A1 Mar. 25, 2004

(51) Int. Cl.$^7$ ............................................. G01G 19/40
(52) U.S. Cl. ..................... 177/1; 177/25.15; 177/145; 702/175; 705/407
(58) Field of Search ................... 177/1, 25.15, 119–121, 177/145; 702/175; 705/407, 414, 415

(56) References Cited

U.S. PATENT DOCUMENTS

| | | | | |
|---|---|---|---|---|
| 3,960,227 A | | 6/1976 | Zucker et al. ............... | 177/210 |
| 4,709,770 A | * | 12/1987 | Kohashi et al. ............... | 177/50 |
| 5,300,736 A | * | 4/1994 | Ehrhardt ...................... | 177/145 |
| 5,308,930 A | * | 5/1994 | Tokutu et al. ............. | 177/25.13 |
| RE34,839 E | * | 1/1995 | Tolson ............................ | 177/5 |
| 5,576,520 A | * | 11/1996 | Waterman et al. .......... | 177/145 |
| 5,635,679 A | * | 6/1997 | Kohashi et al. .......... | 177/25.13 |
| 5,990,422 A | * | 11/1999 | Komori et al. .......... | 177/25.11 |
| 6,084,184 A | * | 7/2000 | Troisi .......................... | 177/145 |
| 6,107,579 A | * | 8/2000 | Kinnemann ................. | 177/145 |
| 6,265,675 B1 | | 7/2001 | Hubler et al. ............. | 177/25.15 |
| 6,359,238 B1 | | 3/2002 | Ursu ............................. | 177/1 |
| 2002/0060097 A1 | | 5/2002 | Thiel | |

OTHER PUBLICATIONS

English language abstract of DE 10,058,217 (Naiu Mircea), Jun. 2002.*

* cited by examiner

Primary Examiner—Randy W. Gibson
(74) Attorney, Agent, or Firm—Philip G. Meyers

(57) ABSTRACT

A method is provided for weighing a series of mail pieces such as letters, flats or a mixture thereof, that are being conveyed through a weighing module. Each mail piece has a length which falls within a range bounded by a maximum length and a minimum length. The mail pieces are conveyed through the weighing module at a substantially constant speed while maintaining a minimum gap between successive mail pieces as the mail pieces pass through the weighing module. The weight of each mail piece is measured during a measurement time when that mail piece is the only mail piece moving on the scale. The scale is sized so that measurement times for mail pieces between the maximum and minimum lengths will vary.

13 Claims, 4 Drawing Sheets

METHOD FOR WEIGHING MAIL PIECES

FIELD OF THE INVENTION

The invention relates to weighing methods of the type used to weigh postal mail, in particular letters and flats.

BACKGROUND OF THE INVENTION

Weighing modules are commonly incorporated into conveyor systems for handling mailed parcels or packages for various purposes, such as determining whether the item is too heavy for subsequent processing and needs to be diverted. Weighing of flat mail (letters and flats) is less easy to accomplish within a letter sorting process because letters are conveyed at high speed in most automated sorting machines.

Schererz et al. U.S. patent application Ser. No. 09/969,274, filed Oct. 2, 2001, Pub. No. 20020070149, Jun. 13, 2002, describes a mixed mail sorting machine wherein a feeder receives a stack of incoming mail pieces and outputs the mail pieces one at a time in a vertical position. A scanner receives mail pieces from the feeder and scans each mail piece in a vertical position to read sorting information thereon. A transport device turns the mailing through a 180 degree arc, and then a reorientation conveyor receives the scanned mail pieces from the scanner and re-orients each mail piece from a vertical to a horizontal position. Mail passes to a splitter conveyor including a movable divert section which diverts each mail piece to an upper path or a lower path. A bin module which includes upper and lower bin sections receive mail pieces from the upper and lower paths, respectively. Each bin section includes a row of bins and an associated series of tiltable conveyor sections which can be actuated to drop a mail piece into the associated bin. A control system tracks each mail piece as it moves from the scanner to the bins and controls operation of the divert section and the tiltable conveyor section so that each mail piece is sorted to predetermined bin based on the sorting information read by the scanner.

The foregoing mixed mail sorter has proven effective for sorting mail in a variety of thicknesses and sizes. A printer 124 is used to apply of bar codes or other machine readable patterns to the mail pieces as they pass out of the turner module. However, the foregoing mixed mail sorting system has no means of weighing a mail piece as it passes along at the conveyed speed, or of metering mail based on the weight of each mail piece.

SUMMARY OF THE INVENTION

The present invention provides a method for weighing a series of mail pieces such as letters, flats or a mixture thereof, that are being conveyed through a weighing module. Each mail piece has a length which falls within a range bounded by a maximum length and a minimum length. The mail pieces are conveyed through the weighing module at a substantially constant speed while maintaining a minimum gap between successive mail pieces as the mail pieces pass through the weighing module. The weight of each mail piece is measured during a measurement time when that mail piece is the only mail piece moving on the scale. The scale is sized so that measurement times for mail pieces between the maximum and minimum lengths will vary.

The weighing module preferably includes a feeder that feeds the series of mail pieces to the scale, an entry sensor positioned to detect entry of a mail piece onto the scale, and an exit sensor to detect exit of a mail piece from the scale. According to a preferred form of the invention, the measurement period starts when the entry sensor detects that a trailing edge of an incoming mail piece has passed the entry sensor, and the exit sensor does not detect a mail piece at the scale exit. The measurement period ends when the exit sensor detects the leading edge of the mail piece then moving on the scale, or when the entry sensor detects a leading edge of a new mail piece entering the scale (whichever first occurs.) In this manner, the weights of a series of mail pieces being conveyed in an upright or near-upright position can be accurately determined.

The invention further provides a method for configuring a scale for use in such a method, considering the desired parameters such as transport speed, the gap between mail pieces, and the minimum and maximum mail piece lengths.

In another aspect, the invention provides a mail sorting machine, especially for handling mixed mail, in which a weighing module of the invention has been incorporated. Such a machine includes a feeder that receives a stack of incoming mail pieces and outputs the mail pieces one at a time in a vertical position, a scanner that receives mail pieces from the feeder and scans each mail piece in a vertical position to read sorting information thereon, a weighing module that receives a series of mail pieces from the scanner and weighs each mail piece as it passes through the weighing module, optionally a transport section that receives mail pieces from the weighing module and directs them along a path such as an arc, a printer station that includes a printer positioned to print a postal meter mark or permit mark on each mail piece based on the weight determined by the weighing module, a reorientation conveyor that receives the scanned mail pieces and re-orients each mail piece from a vertical to a horizontal position, and a bin module that receives mail pieces from the reorientation conveyor and has means for sorting the mail pieces based on sorting information read by the scanner. "Vertical" for this purpose should be understood to include near-vertical positions as well, such as the 8 degree tilt discussed hereafter. These and other aspects of the invention are explained further in the detailed description that follows.

BRIEF DESCRIPTION OF THE DRAWING

In the accompanying drawings, wherein like numerals denote like elements.

DETAILED DESCRIPTION

Figure 1:
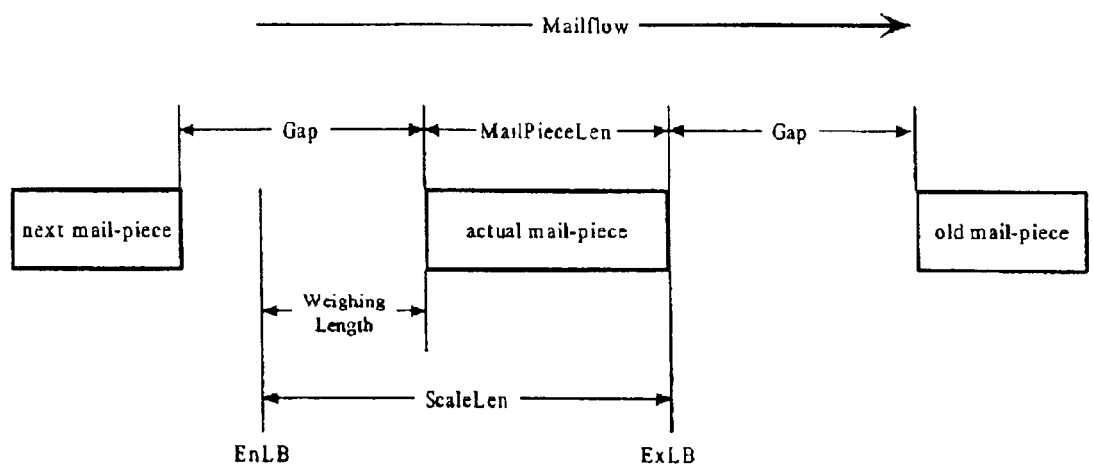
FIG. 1 is a schematic diagram of a weighing module of the invention, weighing a maximum length mail piece.

For correct weighing, it is essential that only one piece of mail moves across the platform of the scale during the measurement time. To fulfill this requirement, two light barriers control the weighing process. One is positioned at the incoming side of the scale (entry light barrier, EnLB), and the second is at the outgoing side (exit light barrier, ExLB). A scale controller monitors each of the light beams to determine if the beam is interrupted or not interrupted by a mail piece.

The weighing process starts as soon as the EnLB has detected the trailing edge of an incoming mail piece and the ExLB is not interrupted. If the second condition is not fulfilled, the incoming mail-piece is not located on the scale alone. In this case, weighing must be delayed until ExLB is free, that is, indicates no interruption. This decreases the time available for measurement of each mail piece as a series of mail pieces is conveyed through the weighing module.

Once a weighing process is started, the scale controller collects raw data until the condition of termination is fulfilled. Collecting data is terminated when the ExLB detects the leading edge of the actual mail-piece moving across the scale or the EnLB detects the leading edge of a new mail-piece entering the scale. Upon termination, the scale controller calculates the real weight using the raw data, the calibration factor and the factors for temperature compensation. Thereafter, the weight is transmitted to a host computer for later use, such as the printing of metered postage on the mail piece based on the measured weight.

In the following, MinMpLen represents minimum length of a mail piece, MaxMpLen represents maximum length of a mail piece, MeasTime (measurement time) means the time required for a mail piece to stay alone at the weighing unit, and MeasLen (measurement length) means the distance a mail piece moves in MeasTime (in this example, MeasTime*0.9 m/s). ScaleLen is the length of the weighing unit (scale). According to the invention, ScaleLen=MaxMpLen+MeasLen, that is, the length of the scale must be at least equal to the maximum mail piece length plus the measurement length. This permits the mail piece to completely enter the scale and remain thereon long enough so that a measurement can be made. MinGap is the minimum gap provided by the feeder (180 mm in this example.)

The weighing time (MeasTime) is not constant. It depends on the following parameters: length of the platform of the scale, ScaleLen (a constant), transport speed (preferably a constant for purposes of the invention), the gap between two successive mail pieces (variable within limits), and the length of the mail piece to be weighed, also variable within limits. The transport speed in this example 0.9 m/sec=0.9 mm/msec. The minimum gap between two mail-pieces is selected as 180 mm and tends to remain constant once selected by operation of the conveying system and its feeder.

Given this information, the weighing cell can then be configured. The minimum length of the weighing cell is limited by the maximum mail piece length plus measurement time. It must be long enough to weigh the longest mail piece to pass through it. The maximum cell length is limited by the minimum mail piece length, given that only one mail piece is allowed on the scale during the measurement time. As a result:

MinMpLen=2*MeasLen+MaxMpLen−2*MinGap

MinMpLen=MeasLen+ScaleLen−2*MinGap

Minimum mail piece length equals twice the measurement length plus the maximum mail piece length minus twice the minimum gap provided by the conveying system. This in turn equals measurement length plus scale length minus twice the minimum gap provided by the feeder.

Referring to FIG. 1, in a first example, MpLen>ScaleLen−MinGap. The minimum weighing-time is therefore achieved with the longest mail piece, which is defined in this example as 356 mm. Accordingly:

WeighingLength=ScaleLen−MailPieceLen $$WeighingTime = \frac{WeighingLength}{TransportSpeed}$$

Figure 2:
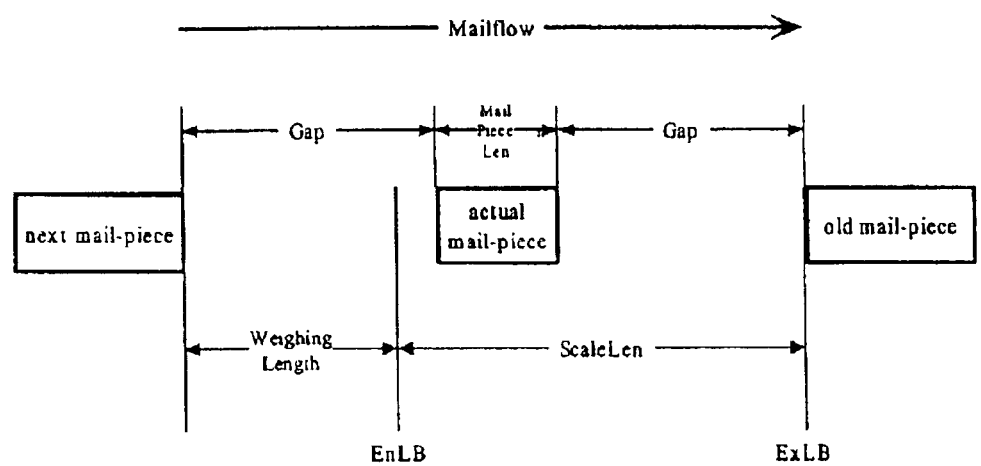
FIG. 2 is the weighing module of FIG. 1, weighing a minimum length mail piece.

The weighing length for the longest mail piece is independent of the gap. To achieve a weighing time of at least 90 msec for the longest mail piece to be weighed, the weighing length can be calculated as WeighingLength=WeighingTime*TransportSpeed, =90 msec*0.9 mm/msec= 81 mm. Given a desired maximum mail piece length of 356 mm, the scale length can be determined as ScaleLen= MaxMailPieceLen+WeighingLength=356 mm+81 mm=437 mm. As shown in FIG. 2, the minimum mail piece length to achieve 90 msec weighing time can be calculated as MinMailPieceLen=ScaleLen+WeighingLength−2*Gap, or 437 mm+51 mm−360 mm=158 mm. This range includes C6 envelopes (162 mm).

The absolute minimum length among mail pieces to weigh is the postcard of 127 mm length. Under the conditions above, the weighing time for these pieces would be reduced to 55.5 msec, assuming the minimum gap of 180 mm. For weighing times significantly below 90 msec, an accurate weight cannot be determined from the scale. In these cases, the scale reports a flag, that the weighing was aborted due to a small mail-piece with a small gap. Additionally the weight, calculated up to the time the weighing is terminated, is sent to the host computer and may be used to actuate a downstream printer. The mail piece may also be diverted by the sorter to an error handling process, such as offline weighing.

In summary, according to the invention the scale length and transport speed are fixed parameters. In this example, scale length=437 mm and transport speed=0.9 m/sec. The variable parameters are mail piece length, here 127 mm to 356 mm and minimum gap, here 180 mm to 209 mm. As the foregoing equations show, given a constant transport speed and a substantially constant gap between successive mail pieces, the measurement time will vary depending on the lengths of the mail pieces.

Figure 3:
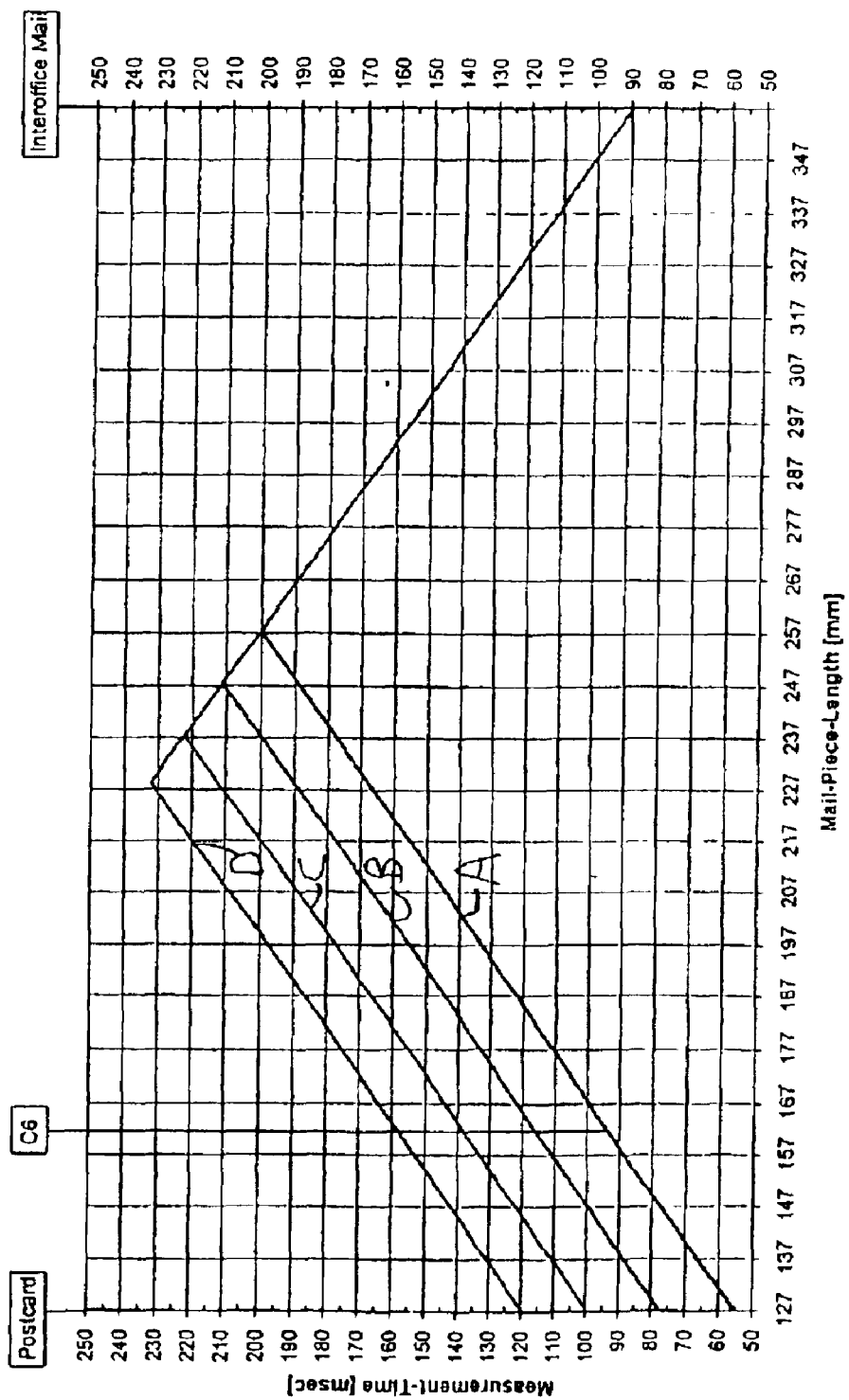
FIG. 3 is a graph plotting scale measurement time versus mail piece length for a representative weighing method of the invention.

Referring to FIG. 3, a series of mail pieces that are at the minimum permitted length have a low measurement time. Since the gap is constant and each mail piece is short relative to the scale length, the time in which a single mail piece is on the scale alone is reduced. At the other extreme, a series of mail pieces that are at the maximum permitted length also have a low measurement time, again because the time in which a single mail piece is on the scale alone is reduced. In this case, each mail piece takes a long time to completely enter and completely leave the scale, reducing the time in which a valid measurement may be taken. Measurement time is maximized for a series of mail pieces at an intermediate length.

If the weighing time for short mail pieces is too low because they are too close together relative to the length of the scale, then the gap between mail pieces may be increased until the weighing times for such mail pieces reaches an acceptable level, in this case curve A represents a 180 mm gap, curve B a 190 mm gap, curve C a 200 mm gap and curve D a 209 mm gap. These are average gap values; in practice the gap is not controlled with extreme precision.

Figure 4:
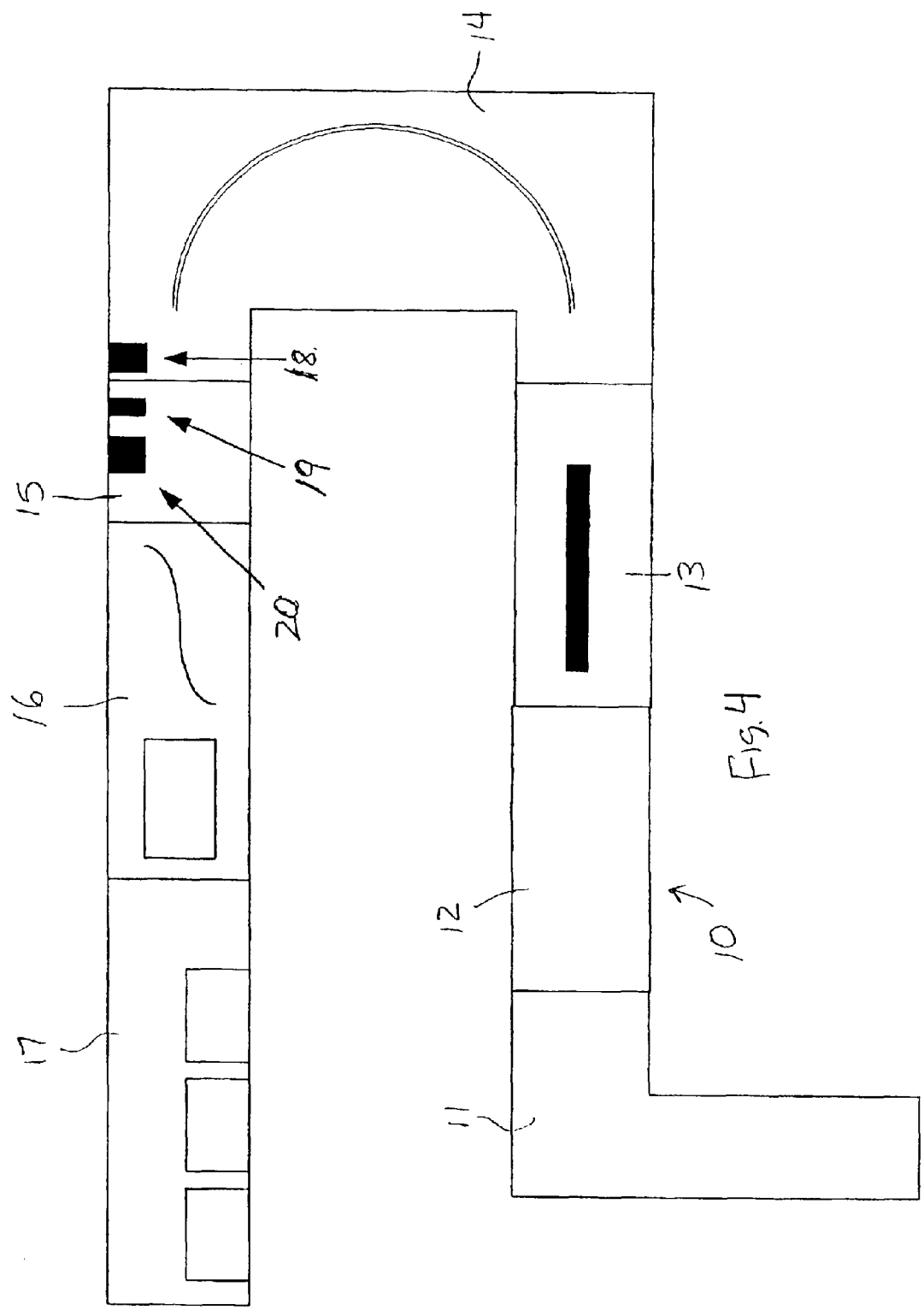
FIG. 4 is a schematic diagram of a modified mixed mail sorter according to the invention.

A weighing module and method according to the invention is usable with a mixed mail sorter as described in Schererz et al. U.S. patent application Ser. No. 09/969,274, filed Oct. 2, 2001, Pub. No. 20020070149, Jun. 13, 2002, and also Schererz U.S. Pat. No. 6,186,312, Feb. 13, 2001, the entire contents of which patent and patent application are incorporated herein by reference. As shown in FIG. 4, a modified mixed mail sorter 10 according to the invention includes a feeder module 11, scanner module 12, a turner module 14, a splitter/twister module 16 and one or more bin modules 17, as described in the above-referenced patent and patent application. A weighing module 13 according to the invention is preferably incorporated between the scanner 11 and turner section 14 of the mixed mail sorter 10. Mail pieces emerging from the turner 14 reach a printing station 15 wherein an inline printer 18 prints a delivery bar code (such as a Postnet code) on the mail piece as a result of the scan, which code is then verified by a bar code scanner 19 located immediately downstream from the printer. If the verifier registers an unreadable bar code, the mail piece may be diverted to a reject bin instead of to its previously assigned destination bin.

In addition, according to a further aspect of the invention, a meter or permit mark printer 20 may be positioned in printing station 15. This permits postal metering of each mail piece based on the weight of the mail piece as determined by weighing module 13. This is most effective where the mail pieces vary in length but are substantially the same height, so that the metering printer prints at the proper position as the mail pieces are conveyed past it.

Figure 5:
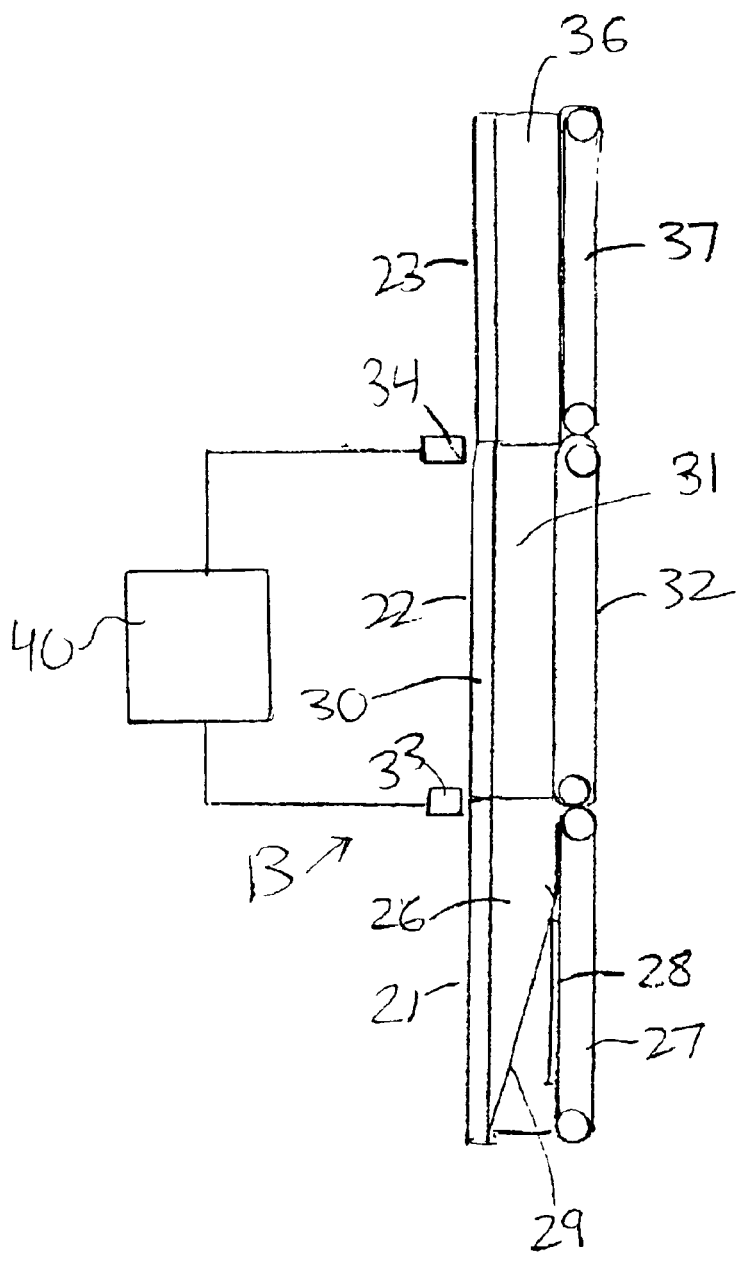
FIG. 5 is a top view of the weighing module shown in FIG. 4.
Figure 6:
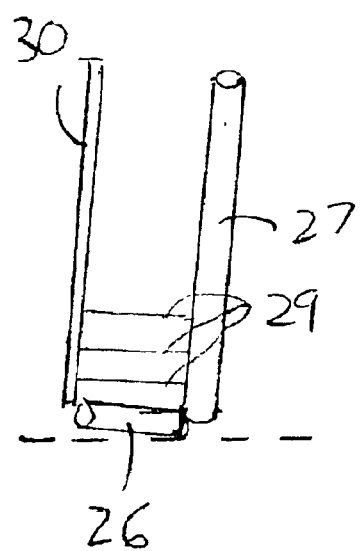
FIG. 6 is an end view of the weighing module shown in FIG. 4.

As shown in FIGS. 5 and 6, the weighing module 13 includes a feeder or controlled transport section 21, a scale 22, and an outgoing transport section 23. Transport section 21 has a bottom transport belt 26 and a side transport belt 27 perpendicular to belt 26. Belts 26, 27 are each slightly tilted, such as by 8 degrees, relative to a horizontal or vertical position. Mail pieces 28 coming from the scanner are in an upright position and are pushed against belt 27 to a tilted position by a number of resilient pushing wires 29 that extend across the width of the transport path as indicated. The remaining side is a wall 30. Scale 22 similarly has a bottom conveyor belt 31 and a side belt 32, also tilted to the same extent as the feeder belts. Entry and exit sensors 33, 34 are positioned as needed to detect entry and exit of mail pieces from scale 22, and send the results to scale controller 40. Controller 40 sends the result of the weighing process to printer 20.

Scale 22 measures the weight of each mail piece as it moves across on belts 31, 32, and is preferably of a type marketed by GFI as described in German Patent Publication DE10058217, published Jun. 13, 2002, the entire contents of which are incorporated by reference herein. Upon exiting scale 22, mail piece 28 remains in its tilted position in outgoing transport section 23 and may remain in that position in turner module 14 as well. Outgoing transport section 23 has bottom and side belts 36, 37 which are in alignment with the belts of scale 22.

It will be understood that the foregoing description is of preferred exemplary embodiments of the invention, and that the invention is not limited to the specific forms shown. For example, the scale could be of the type that uses a pair of upright belts to hold the mail piece to be weighed on both sides. This however increases vibrations during weighing and is not preferred. The weighing results can be used for purposes other than determining postage, for example, determining if a mail piece is within an acceptable weight range for a downstream automated sorting operation. In another application, the scanner and associated OCR logic reads the postage on the mail piece (such as one or more stamps) and the result is compared to the weight of the parcel. If the postage is insufficient, it can be sorted as a reject and returned to sender, forwarded to recipient with postage due, or the like. These and other modifications are within the scope of the invention as expressed by the appended claims.

What is claimed is:

1. A method of weighing each of a series of flat mail pieces, each of which has a length which falls within a range bounded by a maximum length and a minimum length, that are being conveyed through a weighing module including a scale, comprising:

conveying the mail pieces through the weighing module at a substantially constant speed;

maintaining a minimum gap between successive mail pieces as the mail pieces pass through the weighing module;

measuring the weight of each mail piece during a measurement time during which that mail piece is the only mail piece moving on the scale, wherein the scale is sized so that measurement times for mail pieces between the maximum and minimum lengths will vary with the longest measurement time for a length intermediate the maximum and minimum lengths; and generating an error signal when measurement time for a mail piece falls below a predetermined minimum weighing time.

2. The method of claim 1, wherein the minimum gap between successive mail pieces remains substantially constant as a series of mail pieces are weighed.

3. The method of claim 1, wherein the mail pieces are conveyed and fed to the scale in a substantially upright position on their bottom edges using belt conveyors.

4. The method of claim 2, wherein the mail pieces are conveyed and fed to the scale in a substantially upright position on their bottom edges using belt conveyors.

5. The method of claim 1, wherein the weighing module includes a feeder for feeding a series of mail pieces to the scale in a position for weighing, an entry sensor positioned to detect entry of a mail piece onto the scale, and an exit sensor to detect exit of a mail piece from the scale, and the measurement period starts when the entry sensor detects that a trailing edge of an incoming mail piece has passed the entry sensor and the exit sensor does not detect a mail piece at the scale exit, and ends when the exit sensor detects the leading edge of the mail piece moving on the scale or the entry sensor detects a leading edge of a new mail piece entering the scale.

6. The method of claim 4, wherein the weighing module includes a feeder for feeding a series of mail pieces to the scale in a position for weighing, an entry sensor positioned to detect entry of a mail piece onto the scale, and an exit sensor to detect exit of a mail piece from the scale, and the measurement period starts when the entry sensor detects that a trailing edge of an incoming mail piece has passed the entry sensor and the exit sensor does not detect a mail piece at the scale exit, and ends when the exit sensor detects the leading edge of the mail piece moving on the scale or the entry sensor detects a leading edge of a new mail piece entering the scale.

7. The method of claim 4, wherein:

weighing length equals the predetermined minimum weighing time for the scale times transport speed;

scale length equals the maximum mail piece length plus the weighing length; and minimum mail piece length equals scale length plus weighing length minus two times the gap between successive mail pieces.

8. The method of claim 6, wherein:

weighing length equals the predetermined minimum weighing time for the scale times transport speed;

scale length equals the maximum mail piece length plus the weighing length; and minimum mail piece length equals scale length plus weighing length minus two times the gap between successive mail pieces.

9. A method of weighing each of a series of flat mail pieces, each of which has a length which falls within a range bounded by a maximum length and a minimum length, that are being conveyed through a weighing module, the weighing module including a feeder for feeding a series of mail pieces to a scale, an entry sensor positioned to detect entry of a mail piece onto the scale, and an exit sensor to detect exit of a mail piece from the scale, comprising:

feeding the selected mail pieces through the weighing module in a manner effective to maintain a minimum gap between successive mail pieces that pass through the weighing module; and weighing each mail piece with the scale during a measurement period which starts when the entry sensor detects that a trailing edge of an incoming mail piece has passed the entry sensor and the exit sensor does not detect a mail piece at the scale exit, and which ends when the exit sensor detects the leading edge of the mail piece moving on the scale or the entry sensor detects a leading edge of a new mail piece entering the scale.

10. The method of claim 9, wherein:

successive mail pieces are fed through the weighing module at a substantially constant transport speed with a predetermined minimum gap between mail pieces;

weighing length equals a predetermined minimum weighing time for the scale times transport speed;

scale length equals the maximum mail piece length plus the weighing length; and minimum mail piece length is equal to scale length plus weighing length minus two times the gap between successive mail pieces.

11. The method of claim 10, wherein the mail pieces are fed to the scale by the feeder in a substantially upright position on their bottom edges using belt conveyors.

12. The method of claim 1, further comprising diverting from the series of mail pieces a mail piece for which an error signal was generated.

13. The method of claim 9, wherein the gap between successive mail pieces remains substantially constant as the series of mail pieces are weighed.

* * * * *